United States Patent [19]

Makiyama et al.

[11] Patent Number: 5,640,198
[45] Date of Patent: Jun. 17, 1997

[54] IMAGE-INFORMATION FORMAT CONTROL DEVICE FOR CONTROLLING TRANSMISSION OF VARIED FORMATS OF IMAGE DATA STORED IN A SINGLE FORMAT

[75] Inventors: Takeshi Makiyama, Kashiwa; Yoshihiro Nakagawa, Midori-ku; Keiichi Hibi, Matsudo; Tsuneaki Iwano, Tokyo; Osamu Nakamura, Hanno; Hirotaka Nakano, Musashino, all of Japan

[73] Assignees: Sharp Kabushiki Kaisha, Osaka; Nippon Telegraph & Telephone Corp, Tokyo, both of Japan

[21] Appl. No.: 363,021

[22] Filed: Dec. 23, 1994

[30] Foreign Application Priority Data

Dec. 24, 1993 [JP] Japan ................... 5-328955

[51] Int. Cl.[6] .................................. H04N 7/24
[52] U.S. Cl. .................... 348/17; 348/19; 348/15; 348/441
[58] Field of Search .................... 348/7, 12, 13, 348/15, 17, 19, 441, 445, 453, 384, 426, 469, 420, 403, 400, 401, 402; 455/5.1

[56] References Cited

U.S. PATENT DOCUMENTS

| 5,099,325 | 3/1992 | Artieri et al. | 348/412 |
|---|---|---|---|
| 5,196,931 | 3/1993 | Kondo | 348/420 |
| 5,196,933 | 3/1993 | Henot | 348/420 |
| 5,253,058 | 10/1993 | Gharavi | 348/409 |
| 5,272,520 | 12/1993 | Kanoh et al. | 348/453 |
| 5,280,540 | 1/1994 | Addeo et al. | 348/495 |
| 5,367,331 | 11/1994 | Secher et al. | 348/17 |
| 5,373,375 | 12/1994 | Weldy | 348/441 |

FOREIGN PATENT DOCUMENTS

| 5068241 | 3/1993 | Japan | H04N 7/01 |
|---|---|---|---|
| 6209431 | 7/1994 | Japan | G04N 5/265 |

OTHER PUBLICATIONS

The International Conference on Signal Processing Applications & Technology; ICSPAT '93; Sep. 28, 1993 – Oct. 1, 1993; Santa Clara CA; "An H.261 Single–Chip low Bit Rate Video–Codec" by Y. Rasse, pp. 22–31.

Primary Examiner—John K. Peng
Assistant Examiner—Nathan J. Flynn

[57] ABSTRACT

Communication between an image-information storage device and a terminal is made possible even in a case where they have images of different image formats. An image data delivery request, transmitted from any of a plurality of terminals and received by a receiving portion, includes information indicating that the terminal has a source format of CIF or QCIF. This information is transferred to a communication control portion which informs the source format control portion of the source format (CIF or QCIF of) the terminal. When the terminal has the CIF source format, the required data transmitted from an image-information storage device are transmitted through a transmitter portion to the terminal. When the terminal has the QCIF source format, a part of the image data transferred from the image-information storage device is extracted and converted into data of QCIF format by the source format control portion. The converted data of QCIF source format are then transmitted through a transmitting portion to the terminal.

12 Claims, 9 Drawing Sheets

| 1 | 2 |
|---|---|
| 3 | 4 |
| 5 | 6 |
| 7 | 8 |
| 9 | 10 |
| 11 | 12 |

ARRANGEMENT OF
GOB OF CIF FORMAT

| 1 |
|---|
| 3 |
| 5 |

ARRANGEMENT OF
GOB OF QCIF FORMAT

FIG.9

CIF DATA STOERD

MACRO-BLOCK ADDRESS

IMAGE-INFORMATION DATA CONVRTED INTO QCIF FORMAT

| | 1 | 2 | 3 | 4 | 5 | 6 | 7 | 8 | 9 | 10 | 11 | |
|---|---|---|---|---|---|---|---|---|---|---|---|---|
| GOB3 | 4 | 5 | 6 | 7 | 8 | 17 | 18 | 19 | 20 | 21 | 22 | GOB4 |
| | 15 | 16 | 17 | 18 | 19 | 28 | 29 | 30 | 31 | 32 | 33 | |
| | 26 | 27 | 28 | 29 | 30 | | | | | | | |
| | 1 | 2 | 3 | 4 | 5 | 6 | 7 | 8 | 9 | 10 | 11 | |
| GOB5 | 4 | 5 | 6 | 12 | 13 | 14 | 15 | 16 | 17 | 18 | 19 | GOB6 |
| | 15 | 16 | 17 | 23 | 24 | 25 | 26 | 27 | 28 | 29 | 30 | |
| | 26 | 27 | 28 | | | | | | | | | |
| | 1 | 2 | 3 | 4 | 5 | 6 | 7 | 8 | 9 | 10 | 11 | |
| GOB7 | 4 | 5 | 6 | 12 | 13 | 14 | 15 | 16 | 17 | 18 | 19 | GOB8 |
| | 15 | 16 | 17 | 23 | 24 | 25 | 26 | 27 | 28 | 29 | 30 | |
| | 26 | 27 | 28 | | | | | | | | | |
| | 1 | 2 | 3 | 4 | 5 | 6 | 7 | 8 | 9 | 10 | 11 | |
| GOB9 | 4 | 5 | 6 | 12 | 13 | 14 | 15 | 16 | 17 | 18 | 19 | GOB10 |
| | 15 | 16 | 17 | 23 | 24 | 25 | 26 | 27 | 28 | 29 | 30 | |
| | 26 | 27 | 28 | | | | | | | | | |

IMAGE-INFORMATION FORMAT CONTROL DEVICE FOR CONTROLLING TRANSMISSION OF VARIED FORMATS OF IMAGE DATA STORED IN A SINGLE FORMAT

BACKGROUND OF THE INVENTION

The present invention relates to an image-information format control device and more particularly to an image-information storage and communication system which realizes services for delivering and mailing audio visual information from the image-information storage device to any of a plurality of terminals over a communication network to which they are connected.

The terminals are classified into two groups having different source formats—CIF (Common Intermediate Format) and QCIF (Quarter CIF).

The CIF has a hierarchical structure including 4 hierarchies, i.e., frame, group of blocks (GOB), macro-block (MB) and block, and it represents such a source format that a luminance sample includes 352 pixels×288 lines per frame and a chrominance sample includes 176 pixels×144 lines.

The QCIF is reduced to ½ the number of pixels and lines respectively in comparison with the CIF.

The operation of the conventional image-information storage and communication system will be described below:

Data of each frame includes a picture start code (PSC), temporal reference (TR), type information (PTYPE), extra insertion information (PEI), spare information (PSPARE) (a set of the above-mentioned components is called a frame header) and following thereafter data of GOB. Each frame is divided into 12 GOB for the CIF format and 3 GOB for the QCIF format.

Data of each GOB includes a GOB start code (GBSC), group number (GN), quantizer information (GQUANT), extra insertion information (GEI), spare information (GSPARE) (a set of above-mentioned components is called as a GOB header) and following thereafter data of a macro-block (MB). Each GOB is divided into 33 MBs.

Data of each MB includes a macro-block address (MBA), type information (MTYPE), quantizer information (MQUANT), motion vector data (MVD), coded block pattern (CBP) (a set of the above-mentioned components is called a macro-block (MB)) and following thereafter block data. 1 MB is includes 4 blocks of luminance data and 2 blocks of chrominance data.

Data of one block includes a transform coefficient and a code EOB indicating the end of block marker. Data of a conversion coefficient includes 8×8 data.

In a situation where a terminal, which is capable of handling CIF format, or QCIF format requests the image-information storage device to transmit image-information, data transmitted from the terminal over the data channel are received by the receiving portion. The received data contain data indicating which format (CIF or QCIF) the terminal has and data indicating what kind of image information the terminal requires. The received data are then sent to the image-information storage device 8 through the interface portion thereof. The image-information storage device 8 holds data of image-information in two different formats, CIF and QCIF, and can transmit the requested image-information data in the format specified by the terminal.

Besides conventional interactive communication services such as a telephone, facsimile and so on, an audio delivery service, capable of storing audio-information in a center of networks and capable reproducing it any time it is requested, has recently been provided. With development of digital communication networks, which are represented by Integrated Services Digital Network (ISDN), it has also become possible to utilize image communication services, e.g., an audio visual service. In these circumstances, the demand for image-information delivery services increases more and more and such services have partly been realized.

In the conventional image storage and communication system, the same image is stored in two different formats, resulting in a considerable waste of memory. This is because if image-information data are stored in only one of the formats (i.e., CIF or QCIF), it becomes impossible to communicate with terminals having a different source format.

Furthermore, the conventional image-information reproducing system involves such a problem that in a case when image-information is stored in the format CIF in an image-information storage device at a network center, and a video data receiving terminal can decode video information of the QCIF format only, the image data stored in the CIF format cannot be transmitted from the center to the terminal.

SUMMARY OF THE INVENTION

It is an object of the present invention to provide an image-information format control device for use in an image-information storage and communication system, which realizes image-information communication between an image-information storage device and any terminal in a network, even when the terminal has an image format different from that of the stored image-information; and which, if image-information stored in a data storage portion cannot be decoded by a receiving terminal, converts it into data having a size and a format receivable and decodable at the receiving side.

It is another object of the present invention to provide an image-information format control device in which the application of a source format control device enables a conventional image-information storage and communication system to store image data only in CIF format system with an effective use of its memory and communicate with terminals irrespective of difference in image format of the terminals.

It is another object of the present invention to provide an image-information format control device in which a center control device of the system is provided with a header converting portion which rewrites a header of a source format according to information about communicating conditions in a case wherein the stored source format cannot be received by a receiving terminal for the image reproduction; a source format converting portion which converts a format of image data into a format receivable by the receiving terminal; a code-amount control portion which rewrites or extracts a part of screen image-information to obtain image-information of a format and a size receivable by the receiving terminal. Conversion of a source format from CIF into QCIF can be conducted using the center portion data of the image of CIF to eliminate the possibility of losing necessary information.

Data transmitted from a terminal and received by the receiver portion includes data for identifying a source format (CIF or QCIF) of the terminal and data for identifying a kind of image-information required by the terminal. The format identifying information is transferred to the communication control portion whereby it is read and further transferred to the source format control portion, while the data identifying the requested image-information are sent through the interface portion to the image-information storage device wherefrom the requested image data in the CIF format are transferred through the interface to the source format control portion.

The source format control portion has been informed of the image data format (CIF or QCIF) of the terminal. Therefore, if the terminal uses the CIF format, the data from the image-information storage device are transmitted through the transmitter portion to the receiving terminal without any processing. If the terminal uses QCIF format, the source format control portion extracts a part of the image data received from the image-information storage device, converts the data into QCIF data that are then transmitted through the transmitter portion to the terminal.

The system further includes a header converting portion for rewriting a header of image-information according to the communicating conditions memorized together with image data and the capability of a receiving terminal in a case wherein the image-information stored in the image-information storage device cannot be decoded by the receiving terminal; an image format converting portion for converting a format of image data into a format receivable by the receiving terminal; and a code amount control portion for adjusting an amount of coded data to be transmitted. Further, it can rewrite a part of screen image-information to be of a size and a format receivable by the receiving terminal and it then extracts and transmits the rewritten image-information to the receiving terminal.

To realize the above-mentioned purposes, the present invention was made to provide an image-information format control device which includes a transmitter-receiver portion for transmitting and receiving image-information data, a source format control portion for controlling source formats, an interface portion for connecting with an image-information storage device and a communication control portion for controlling the above-mentioned portions and communications and, which, in a case wherein it is impossible to conduct image data communication between the image-information storage device and a receiving terminal because of incompatibility of the format of the image data stored in the image-information storage device with the format receivable by the terminal, selects a part of the coded image-information to compose data having the format receivable by the receiving terminal and then transmits the data to the receiving terminals.

These and other objects of the present application will become more readily apparent from the detailed description given hereinafter. However, it should be understood that the preferred embodiments of the invention are given by way of illustration only, since various changes and modifications within the spirit and scope of the invention will become apparent to those skilled in the art from this detailed description.

PREFERRED EMBODIMENT OF THE INVENTION

Figure 1:
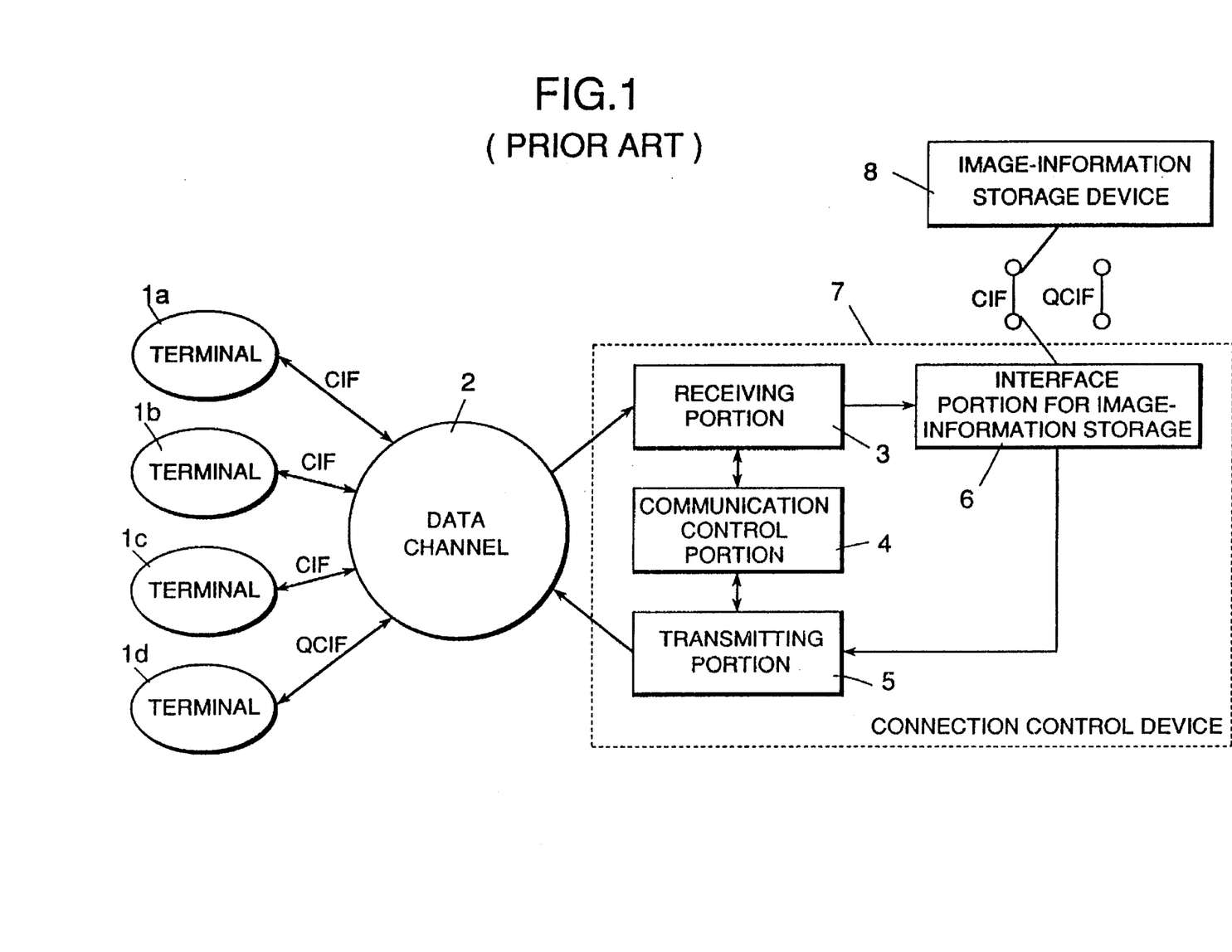
FIG. 1 is a view showing a conventional image-information communication system.

FIG. 1 shows a structure of a conventional image-information storage and communication system which includes terminals 1a–1d, a data channel 2, a receiving portion 3, a communication control portion 4, a transmitting portion 5, an image-information storage device 8, an interface portion 6 for connecting with the image-information storage device 8, and numeral designates a connection control portion.

The terminals 1a–1d are classified into two groups having different source formats—CIF (Common Intermediate Format) and QCIF (Quarter CIF).

Figure 2:
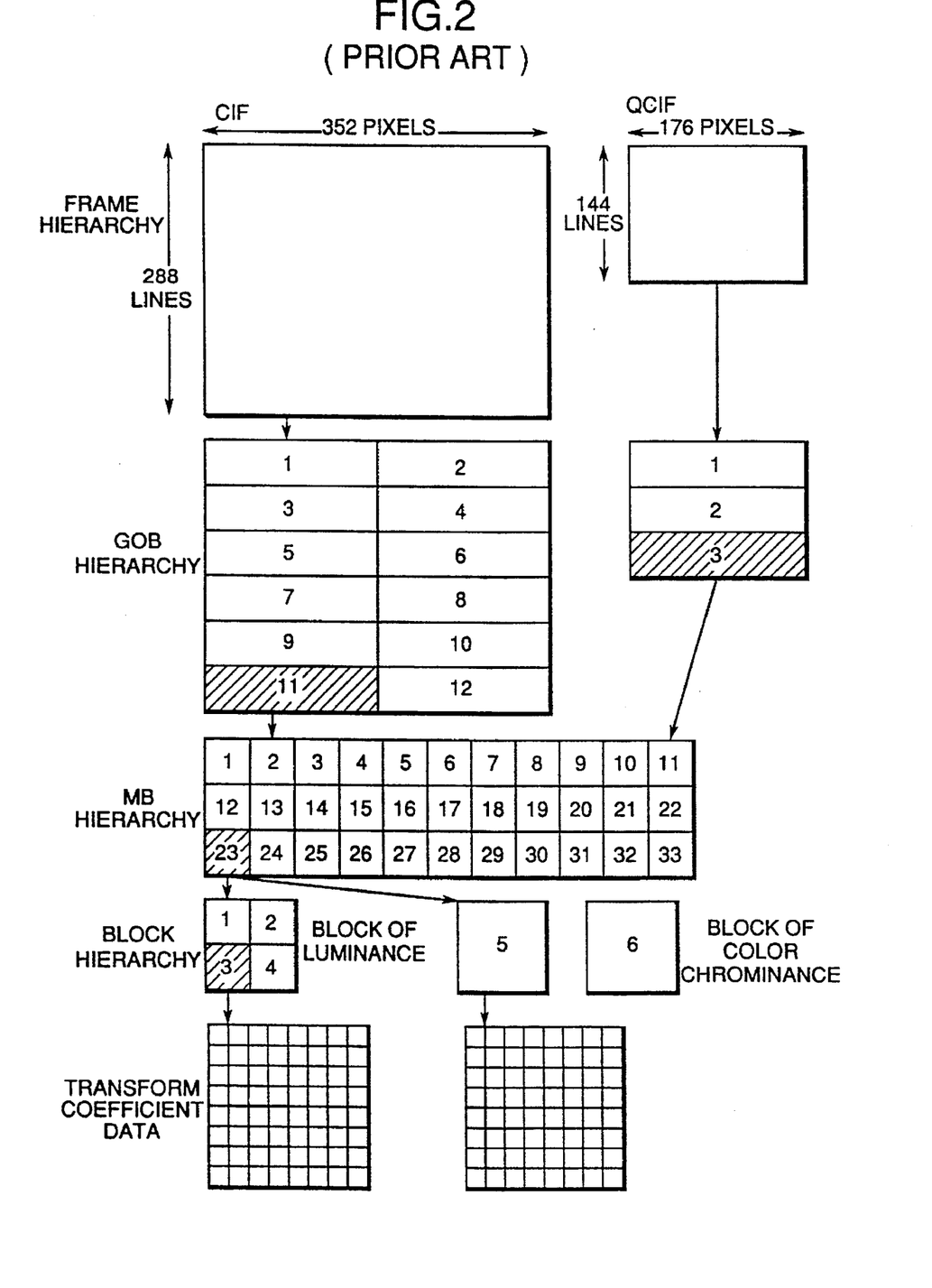
FIG. 2 shows hierarchical structures of conventional CIF and QCIF formats.

The CIF has a hierarchical structure including 4 hierarchies, i.e., frame, group of blocks (GOB), macro-block (MB) and block as shown in FIG. 2, and it represents such a source format that a luminance sample includes 352 pixels×288 lines per frame and a chrominance sample includes 176 pixels×144 lines.

The QCIF is reduced to ½ the number of pixels and lines respectively in comparison with the CIF. A hierarchical structure of data is shown in FIG. 3A–3D.

Figure 3A:
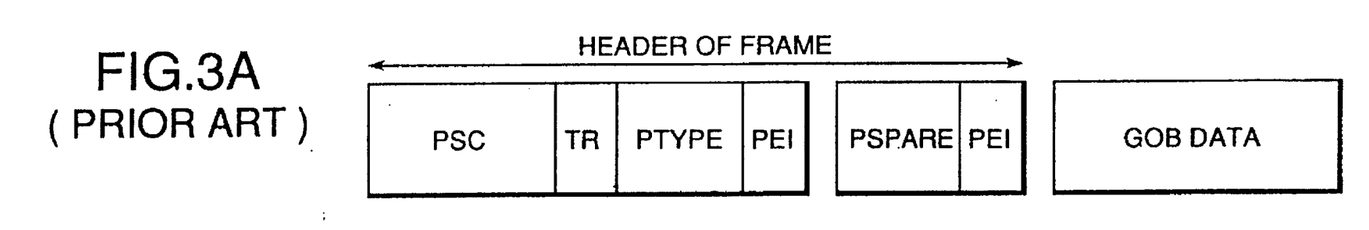
FIGS. 3A, 3B, 3C and 3D show data structures of hierarchies of conventional CIF and QCIF formats.

Referring now to FIG. 2 and 3A–3D, the operation of the conventional image-information storage and communication system will be described below:

As shown in FIG. 3A, data of each frame includes a picture start code (PSC), temporal reference (TR), type information (PTYPE), extra insertion information (PEI), spare information (PSPARE) (a set of the above-mentioned components is called as frame header) and following thereafter data of GOB. Each frame, as shown in FIG. 2, is divided into 12 GOB for CIF format and 3 GOB for QCIF format.

Figure 3B:
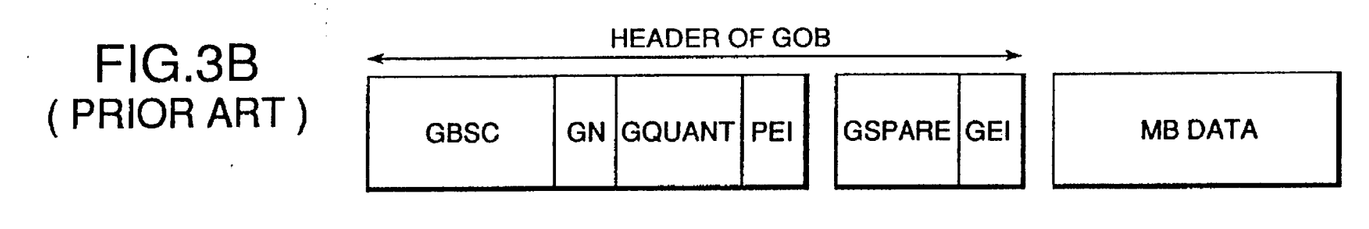

As shown in FIG. 3B, data of each GOB inlcudes a GOB start code (GBSC), group number (GN), quantiser (GQUANT), extra insertion information (GEI), spare information (GSPARE) (a set of above-mentioned components is called as a GOB header) and following thereafter data of a macro-block (MB). Each GOB is divided into 33 MBs as shown in FIG. 2.

Figure 3C:
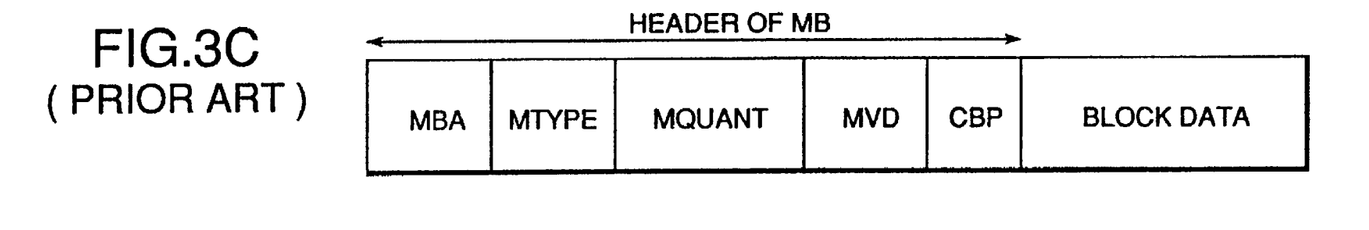

As shown in FIG. 3C, data of each MB includes a macro-block address (MBA), type information (MTYPE), quantiser (MQUANT), motion vector data (MVD), coded block pattern (CBP) (a set of the above-mentioned components is called as a macro-block (MB)) and following thereafter block data. 1 MB is composed of 4 blocks of luminance and 2 blocks of chrominance data.

Figure 3D:
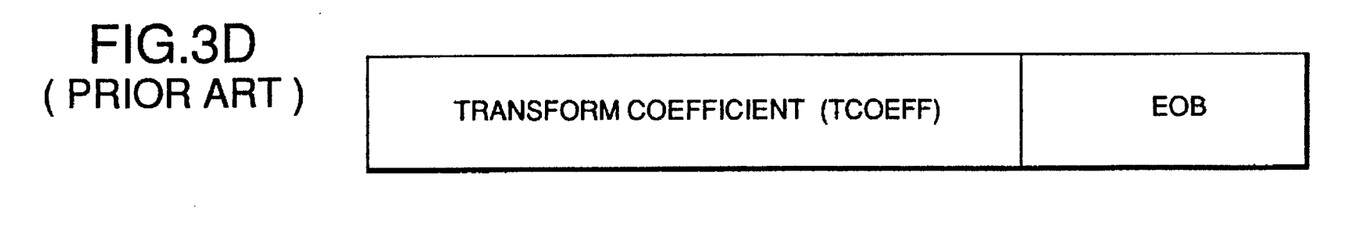

As shown in FIG. 3D, data of one block includes a transform coefficients and a code EOB indicating the end of a block. Data of a transform coefficients are comprised of 8×8 data as shown in FIG. 2.

In a situation where a terminal of CIF format or QCIF format requests the image-information storage device 8 to transmit image-information, data transmitted from the terminal over the data channel 2 are received by the receiving portion 3. The received data contain data indicating which format, CIF or QCIF, the terminal has and data indicating what kind of the image-information the terminal requires. The received data are then sent to the image-information storage device 8 through the interface portion 6 thereof. The image-information storage device 8 holds data of image-information in two different formats CIF and QCIF and can transmit the requested image-information data in the format specified by the terminal.

Besides conventional interactive communication services such as telephone, facsimile and so on, an audio delivery service capable of storing audio-information in a center of networks and capable reproducing it at any requested time, has recently been provided. With development of digital communication networks, which are represented by Integrated Services Digital Network (ISDN), it has also become possible to utilize image communication services, e.g., audio visual service. In these circumstances, the demand for image-information delivery services increases more and more and such services have partly been realized.

Figure 4:
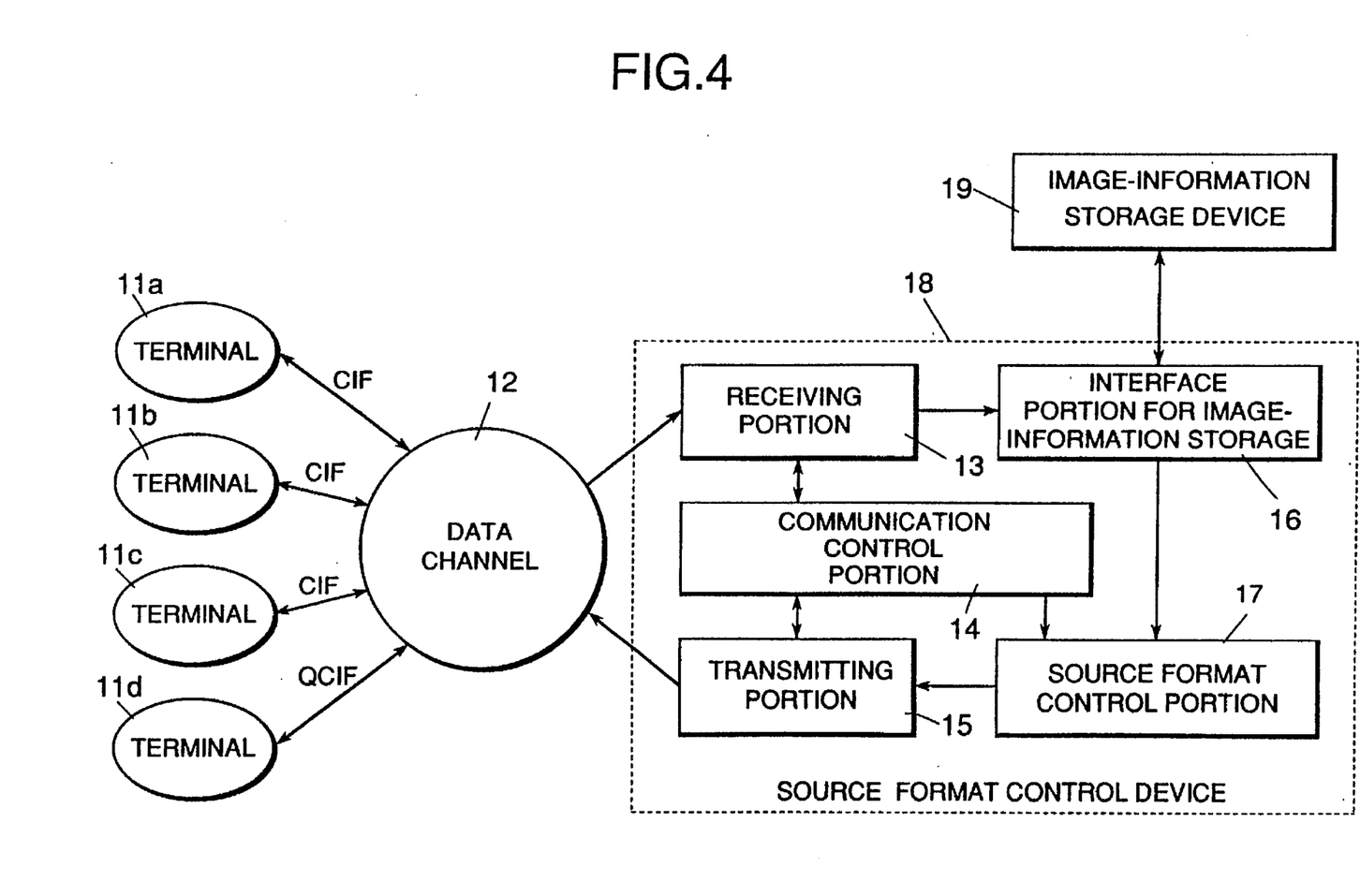
FIG. 4 is a construction view for explaining a source format control device embodying the present invention.

Referring to drawings, a preferred embodiment of the present application will now be described as follows:

FIG. 4 is a construction view for explaining an example of image-information storage and communication system for video delivery service, which is provided with a source format control device according to the present invention. The system includes terminals 11a–11d, a data channel 12, an image-information storage and a source format control portion that includes a receiving portion 13, communication control portion 14, a transmitting portion 15, an interface portion 16 for connecting with the image-information storage device 19 and a source format control portion 17, a source format control device 18 and an image-information storage device 19.

Data transmitted from any terminal 11a–11c are received by the receiving portion 13 wherefrom a part of the data, which indicates a type of data format-CIF or QCIF of the terminal, is sent to the communication control portion 14. The communication control portion 14 in turn reads the data and transfers the data to the source format control portion 17. The other part of the data, which indicates a kind of image data required by the terminal, is transmitted through the interface portion 16 to the image-information storage device 19 wherefrom the requested image data in the format of CIF are transferred through the interface to the source format control portion 17.

The source format control portion 17 has been informed by the communication control portion 14 of the type of image data format (CIF or QCIF) adopted by the terminal. When the terminal uses CIF data, the data of CIF received from the image-information storage device 19 are not subjected to any processing and transmitted through the communication control portion 14 to the terminal. In case of the terminal 11d using QCIF data, the data of CIF received from the image-information storage device 19 are transferred to the source format control portion 17 whereby they are partly extracted and converted into the data of QCIF, which are then transmitted to the receiving terminal 11d through the transmitting portion 15.

Figure 5:
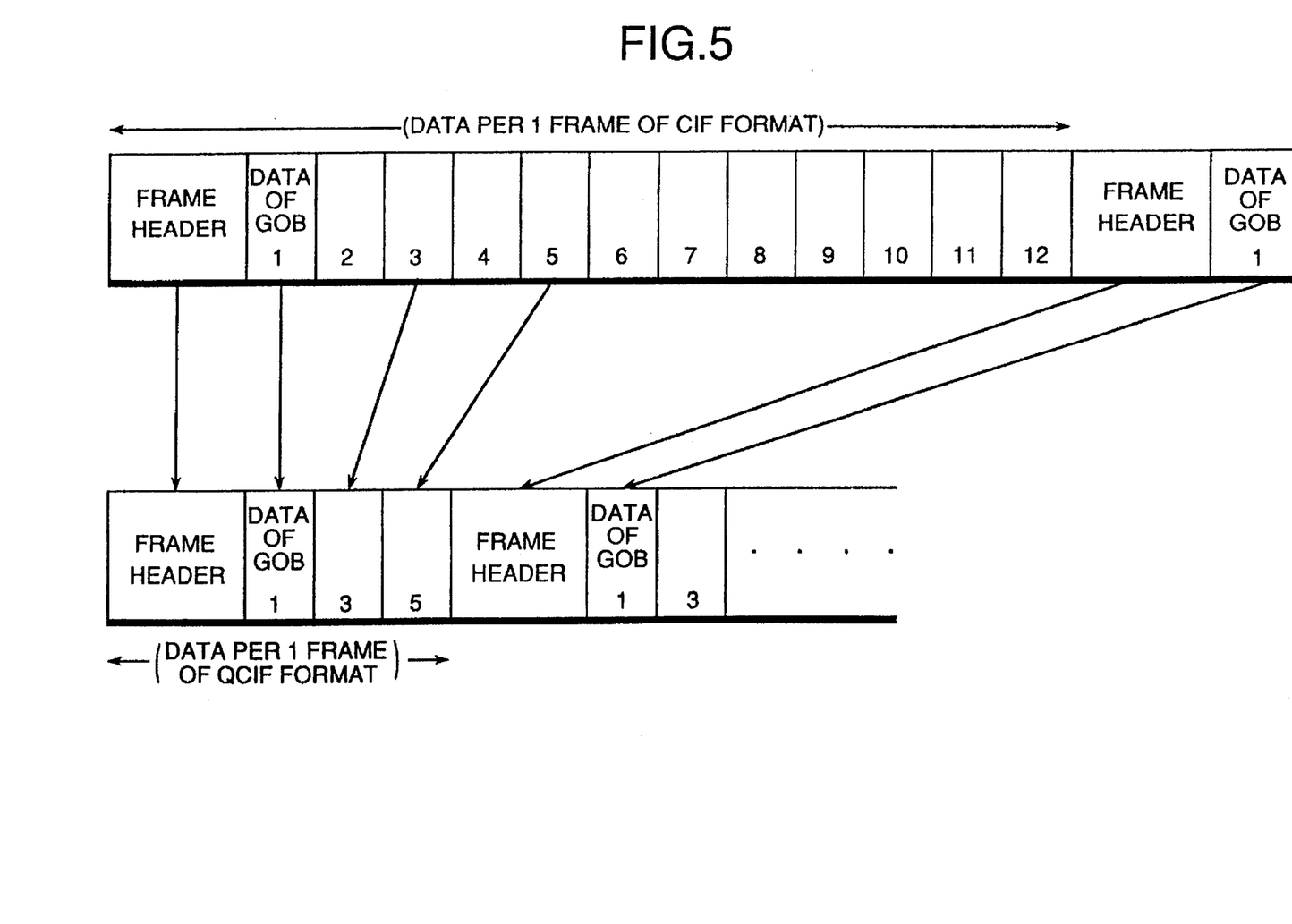
FIG. 5 is an explanatory diagram of CIF-to-QCIF format conversion according to the present invention.

FIG. 5 is a view for explaining how to convert data format into QCIF.

One of methods for converting an image data format from CIF into QCIF, which is applicable in the source format control portion 17, is such that a frame of CIF is divided into 4 divisions and image data contained in one of the divisions, i.e., data of GOB (group of blocks) Nos. 1, 3 and 5 are extracted from GOB hierarchy and transmitted. The data of the other GOBs are not transmitted. In this case, a left upper quarter of a screen image of CIF format is converted into a screen image of QCIF format.

Figure 6:
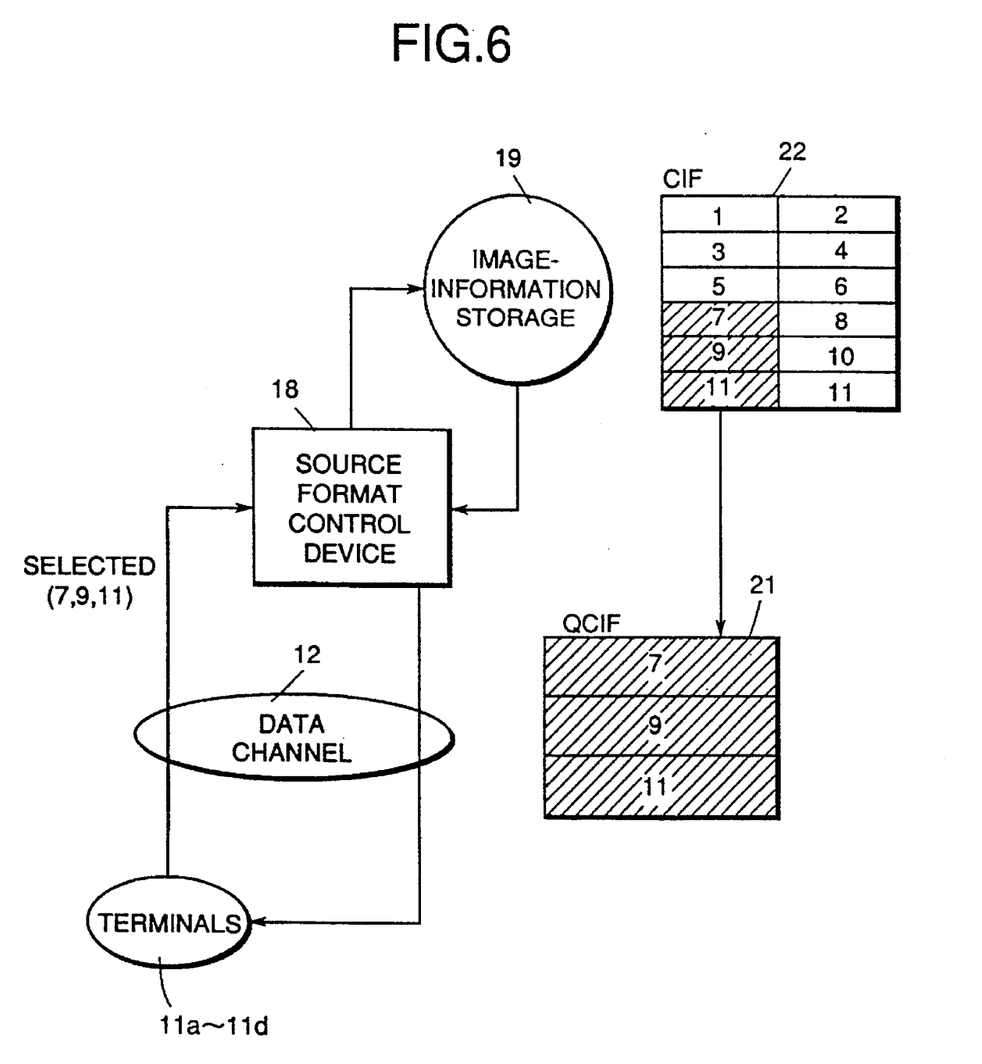
FIG. 6 shows another example of CIF-to-QCIF format conversion according to the present invention.

FIG. 6 is a view for explaining another method of converting data format to QCIF.

The source format control portion 17 stores in its memory a plurality of patterns for extracting data from CIF format 22, any of which can be selected by each terminal. For instance, QCIF format 21 patterns including GOB Nos. (1,3,5), (2,4,6), (7,9,11), (8, 10, 12) respectively are previously prepared. Then, when any one of the patterns is selected from a terminal, the source format control portion 17 transmits data of the selected QCIF format to the terminal.

In an image-information storage device and communication system that realizes video-and-audio information delivery and mailing services over a network connecting terminals to an image-information storage device, the embodiment of the present application, as described above, enables the system to communicate with the terminals even when image data format of the image-information storage device differs from that of the terminals. Namely, the image-information format control device according to the present application includes a transmitting portion and a receiving portion for transmitting and receiving image-information data, a source format control portion for controlling source formats, an interface portion for connecting with an image-information storage device and a communication control portion for controlling the above-mentioned portions and communications. Further, in a situation where it is impossible to conduct image data communication between the image-information storage device and a receiving terminal because of incompatibility of the format of the image data stored in the image-information storage device with the format receivable by the terminal, it extracts a part of the coded image-information to compose data of the format receivable by the receiving terminal and then transmits the data to the receiving terminals.

Figure 7:
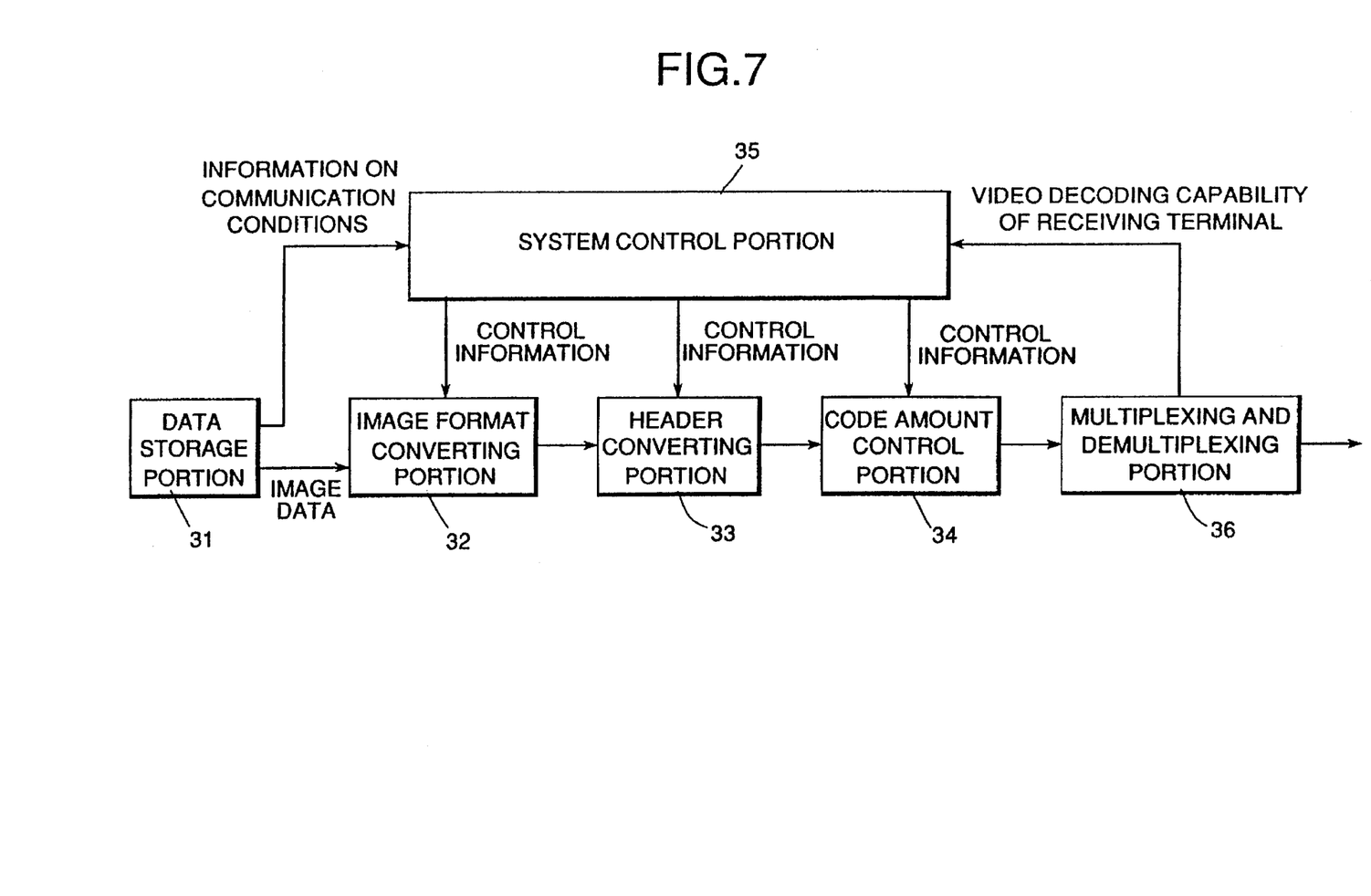
FIG. 7 is a construction view of a source format control portion shown in FIG. 4.

FIG. 7 is a construction view of the source format control portion 17 shown in FIG. 4. FIG. 7 includes a data storage portion 31, an image format converting portion 32, a header converting portion 33, a code amount control portion 34, a system control portion 35 and a multiplexing and demultiplexing portion 36.

First, a communication capability is negotiated between image-information storage center and a motion video terminal at the beginning of communication there between to get an information of video decoding capability of the terminal. The capability information of the terminal is sent from the multiplexing and demultiplexing portion 36 to the system control portion 35. When a request for reproduction of an image is received from the terminal, the system control portion 35 reads requested image data from the data storage portion 31 and transfers the image data to the image format converting portion 32. The system control portion 35 also gets an information indicating communicating conditions such as a format of image data, which has been stored together with the data at the time of storing the data. When the video-decoding capability of the terminal is limited to QCIF and the information on the communication conditions of the stored image data is CIF, the system control portion 35 gives the image format converting portion 32 an instruction for converting the source format CIF into QCIF.

Figure 8:
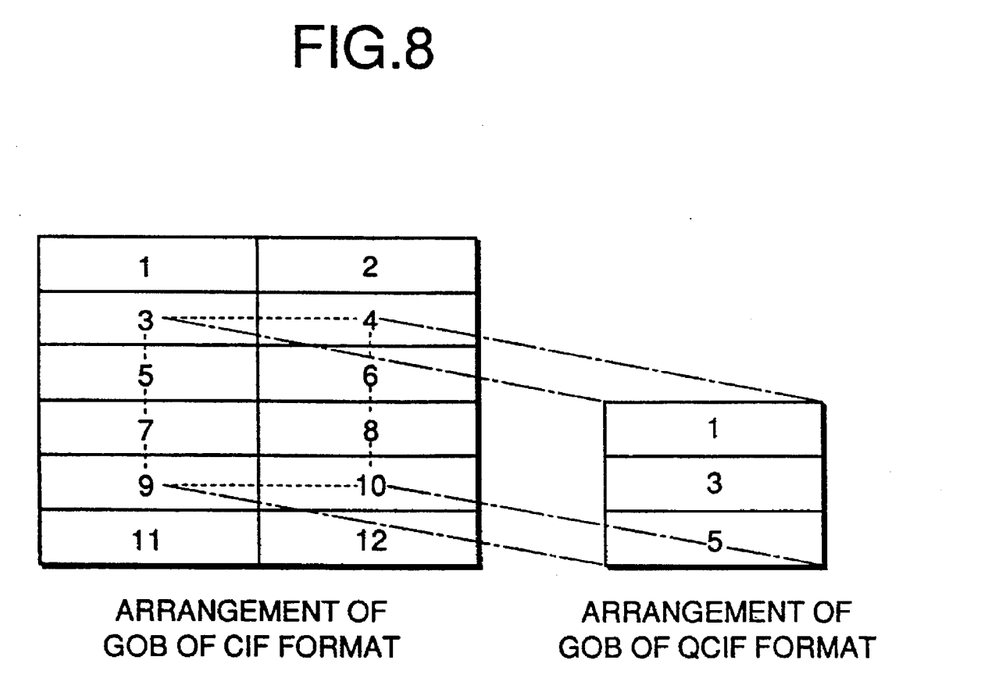
FIG. 8 is a view showing another example of CIF-to-QCIF format conversion method according to the present invention.

The format conversion may easily be performed by selecting three GOB, e.g., GOB1, GOB3 and GOB5 neighboring to each other from the data of format CIF and by rewriting GOB numbers of them. This method, however, causes such a problem that the reproduced image of QCIF is shifted in a vertical or horizontal direction with reference to the stored image of CIF. Since a screen image usually indicates its important object, e.g., a person's figure, at the center portion thereof, the above-mentioned method may lose the desired image-information. Accordingly, image format conversion shall be conducted using a substantially center portion of a stored image of CIF as shown in FIG. 8.

Figure 9:
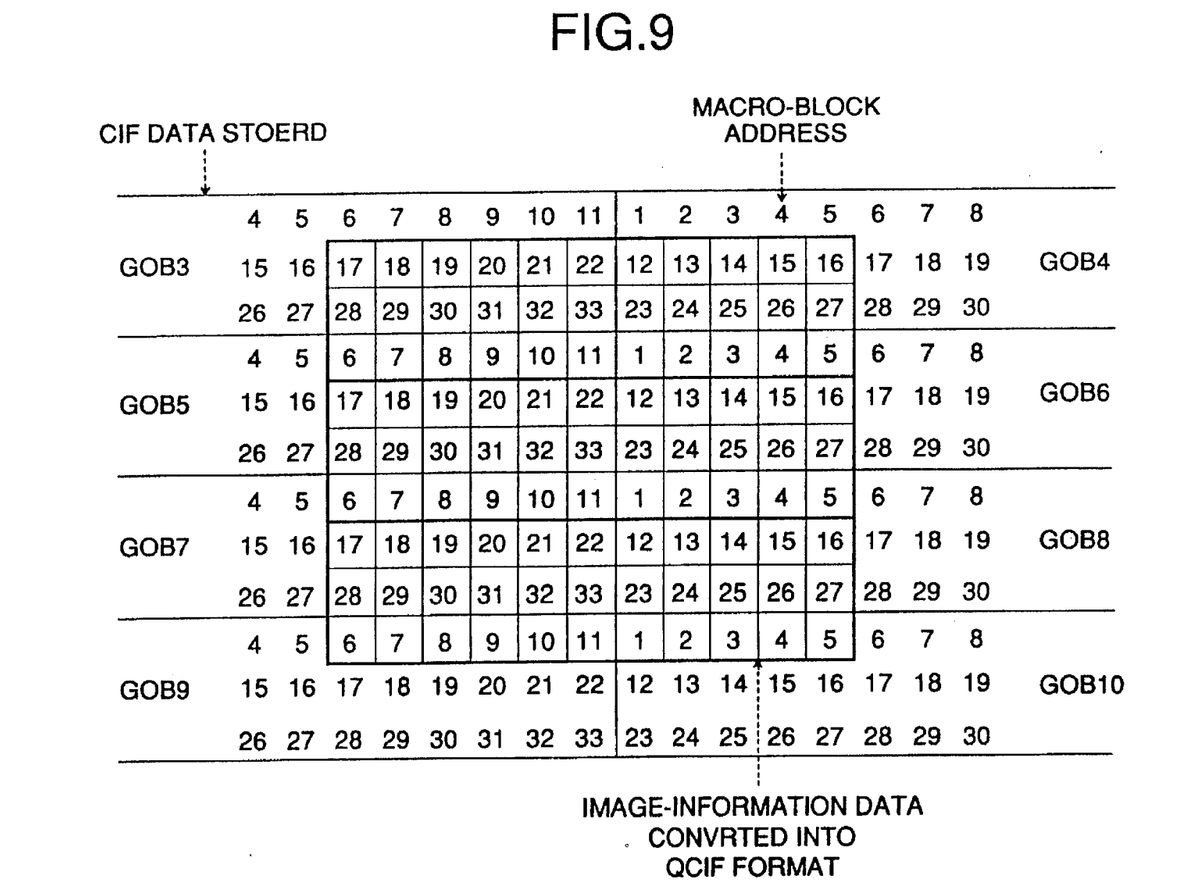
FIG. 9 is a view showing an example of a source format conversion according to the present invention.

Referring to FIG. 9, an example of image format conversion is described below in detail:

Data addressed at MB17 of GOB3 in stored image data of CIF is first selected and addressed at MB1 of GOB1 of the image data of QCIF. The proceeding data of the center portion of the image are sequentially selected and arranged to form an image-information of QCIF format. Next, the converted data of QCIF is processed by the header converting portion 33 that rewrites GOB numbers and MB addresses, e.g., MB17 of GOB3 and MB5 of GOB10 are changed into MB1 of GOB1 and MB33 of GOB3 respectively.

The image data after rewriting the header are transferred to the code amount control portion 34. In a case where a minimum image interval of image-information at storing is the same as that at reproducing, there may occur an underflow of transmission data of the image converted from CIF into QCIF if no adjustment is made in advance. Accordingly, the code amount control portion 34 adjusts a quantity of codes in the image data by inserting therein fill bits for denoting absence of data. Lastly, the processed image data are multiplexed with audio data in the multiplexing and demultiplexing portion 36 and supplied therefrom into the communication network.

In the above-described embodiment of the present application, a screen image-information stored in the image-information storage device and having a format, which cannot be decoded for reproduction of the image at a receiving terminal, is partly rewritten in such a way that they may have a size and a format receivable by the terminal. Then, the converted coded-image data are extracted therefrom and transmitted to the terminal. The embodiment, therefore, includes a header converting portion for rewriting a header of the source format according to an information about communicating conditions, which is memorized together with image data stored, with due consideration of the capability of the receiving terminal; an image format converting portion for converting the image format into a format receivable by the receiving terminal and a code amount control portion for adjusting a quantity of codes in the image data to be transmitted to the receiving terminal.

As many apparently widely different embodiments of this invention may be made without departing from the spirit and scope thereof, it is to be understood that the invention is not limited to the specific embodiments thereof except as defined in the appended claims.

We claim:

1. An image-information format control device comprising:
   a transmitting portion for transmitting image data;
   a receiving portion for receiving requests for image data, each request including format information corresponding to a format in which the image data is to be transmitted;
   a source format control portion for controlling a format of transmitted image data;
   an interface portion for connecting the receiving portion and the source format control portion with an image-information storage device; and
   a communication control portion for controlling the transmitting, receiving, interface and source format control portions,
   transmission of requested image data from the image-information storage device storing a plurality of image data, each stored in a single common format with format information corresponding to a form of the image which is stored, to a requesting receiving terminal being achieved upon determining incompatibility of format information of the requested stored image with format information of the requesting terminal, by extracting and converting a portion of the requested image data from the image information storage device to a format receivable by the receiving terminal and transmitting the extracted and converted image data to the receiving terminal.

2. The image-information format control device of claim 1, wherein said source format control portion includes a plurality of stored data-patterns patterns, each corresponding to a predetermined position of a stored image, and transmits image data in the requested format and of a data-pattern selected by the receiving terminal.

3. The image-information format control device of claim 1, wherein said source format control portion includes,
   a header converting portion for rewriting a header of an image format according to information corresponding to communicating conditions, said information corresponding to communicating conditions being stored together with image data in a data storage portion, and according to a communicating capability of a receiving terminal, upon determining incapability of a receiving terminal to decode and reproduce a format of image data stored in the data storage portion;
   an image format converting portion for converting image data into a format receivable by the receiving terminal; and
   a code amount control portion for controlling an amount of data to be transmitted wherein, upon determining incapability of a receiving terminal to decode and reproduce a format of image data stored in the data storage portion, only a portion of the stored image data is rewritten of a size and a format receivable by the receiving terminal, and then said rewritten portion is extracted and transmitted to the receiving terminal.

4. A format control apparatus comprising:
   receiving means for receiving a request for transmission of one of a plurality of stored images, each stored with first format information corresponding to a format of the image which is stored, the request including second format information corresponding to a format in which the requested image is to be transmitted;
   first means for retrieving the requested stored image and corresponding stored first format information;
   second means for reformatting the retrieved requested image based upon the second format information if the second format information fails to match the first format information corresponding to the retrieved requested image; and
   transmission means for transmitting the reformatted retrieved requested image.

5. The apparatus of claim 4, wherein each of the plurality of images is stored in a single common format.

6. The apparatus of claim 5, wherein the second means reformats the retrieved requested image by maintaining only a predetermined portion of the retrieved requested image for subsequent transmission.

7. The apparatus of claim 5, wherein each of the plurality of images are stored in frames, each frame including a plurality of sequenced groups of blocks (GOB) and each GOB including a plurality of sequenced macroblocks (MB).

8. The apparatus of claim 7, wherein the second means reformats the retrieved requested image by selecting only a predetermined portion of the retrieved requested image for subsequent transmission, including only one of a plurality of prestored sequences of GOBs, each prestored sequence of GOBs including less than all stored GOBs corresponding to the stored image.

9. The apparatus of claim 7, wherein the second means reformats the retrieved requested image by selecting Less than all of the GOBs of the retrieved requested image and by selecting less than all of the MBs of each selected GOB.

10. The apparatus of claim 9, wherein the second means reformats the retrieved requested image by selecting predetermined ones of the MBs of predetermined ones of the GOBs of the retrieved requested image so as to maintain a central portion of the retrieved requested image for transmission.

11. The apparatus of claim 10, wherein the selected predetermined ones of the MBs of the predetermined ones of the GOBs are re-sequenced to correspond to sequential MBs of sequential GOBs of the reformatted retrieved requested image for transmission.

12. An image transmission system, comprising:

a plurality of networked imaging devices, each capable of receiving an image in a predetermined format; and a source format control device, operatively connected to each of the plurality of networked imaging devices, the source format control device including, receiving means for receiving a request for transmission of one of a plurality of stored images, from one of the plurality of networked imaging devices, each stored with first format information corresponding to a format of the image which is stored, the request including second format information corresponding to the predetermined format capable of receipt by the requesting networked imaging device, in which the requested image is to be transmitted, first means for retrieving the requested stored image and corresponding stored first format information, second means for reformatting the retrieved requested image based upon the second format information if the second format information fails to match the first format information corresponding to the retrieved requested image, and transmission means for transmitting the reformatted retrieved requested image to the requesting networked imaging device.

* * * * *